(12) United States Patent
Altman et al.

(10) Patent No.: US 9,923,913 B2
(45) Date of Patent: *Mar. 20, 2018

(54) SYSTEM AND METHOD FOR MALWARE DETECTION LEARNING

(71) Applicant: Verint Systems, Ltd., Herzliya Pituach (IL)

(72) Inventors: Yuval Altman, Herzliya (IL); Assaf Yosef Keren, Ramat Gan (IL); Ido Krupkin, Gan Yavne (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,164

(22) Filed: Mar. 1, 2016

(65) Prior Publication Data

US 2016/0255110 A1   Sep. 1, 2016

Related U.S. Application Data

(63) Continuation of application No. 14/295,758, filed on Jun. 4, 2014, now Pat. No. 9,306,971.

(30) Foreign Application Priority Data

Jun. 4, 2013   (IL) .......................................... 226747

(51) Int. Cl.
*H04L 29/06* (2006.01)
*G06N 99/00* (2010.01)

(52) U.S. Cl.
CPC ....... *H04L 63/1425* (2013.01); *G06N 99/005* (2013.01); *H04L 63/145* (2013.01); *H04L 63/1441* (2013.01)

(58) Field of Classification Search
CPC ............... H04L 63/145; H04L 63/1425; H04L 63/1441; G06N 99/005
See application file for complete search history.

(56) References Cited

U.S. PATENT DOCUMENTS 5,689,442 A   11/1997 Swanson et al.
6,404,857 B1   6/2002 Blair et al.
(Continued)

FOREIGN PATENT DOCUMENTS

WO   WO2013014672   *   1/2013

OTHER PUBLICATIONS

Z. Tian et al. "An Architecture for Intrustion Detection Using Honey Pot," Proceedings of the 2nd Int'l Conference on Machine Learning and Cybernetics, Nov. 2-5, 2003, pp. 2096-2100.*
(Continued)

*Primary Examiner* — Robert Leung
(74) *Attorney, Agent, or Firm* — Meunier Carlin & Curfman

(57) ABSTRACT

Malware detection techniques that detect malware by identifying the C&C communication between the malware and the remote host, and distinguish between communication transactions that carry C&C communication and transactions of innocent traffic. The system distinguishes between malware transactions and innocent transactions using malware identification models, which it adapts using machine learning algorithms. However, the number and variety of malicious transactions that can be obtained from the protected network are often too limited for effectively training the machine learning algorithms. Therefore, the system obtains additional malicious transactions from another computer network that is known to be relatively rich in malicious activity. The system is thus able to adapt the malware identification models based on a large number of positive
(Continued)

examples—The malicious transactions obtained from both the protected network and the infected network. As a result, the malware identification models are adapted with high speed and accuracy.

20 Claims, 2 Drawing Sheets

(56) References Cited

U.S. PATENT DOCUMENTS

| | | | |
|---|---|---|---|
| 6,587,124 B1 | 7/2003 | Slaby | |
| 6,718,023 B1 | 4/2004 | Zolotov | |
| 6,741,992 B1 | 5/2004 | McFadden | |
| 6,757,361 B2 | 6/2004 | Blair et al. | |
| 7,134,141 B2 | 11/2006 | Crosbie | |
| 7,216,162 B2 | 5/2007 | Amit et al. | |
| 7,225,343 B1 | 5/2007 | Honig et al. | |
| 7,287,278 B2 | 10/2007 | Liang | |
| 7,466,816 B2 | 12/2008 | Blair | |
| RE40,634 E | 2/2009 | Blair et al. | |
| 7,587,041 B2 | 9/2009 | Blair | |
| RE43,103 E | 1/2012 | Rozman et al. | |
| 8,122,007 B2 | 2/2012 | Mayer et al. | |
| 8,165,449 B2 | 4/2012 | Ludwig et al. | |
| 8,176,527 B1 | 5/2012 | Njemanze et al. | |
| 8,201,245 B2 | 6/2012 | Dewey et al. | |
| RE43,528 E | 7/2012 | Rozman et al. | |
| RE43,529 E | 7/2012 | Rozman et al. | |
| 8,224,761 B1 | 7/2012 | Rockwood | |
| RE43,987 E | 2/2013 | Rozman et al. | |
| 8,402,543 B1 | 3/2013 | Ranjan et al. | |
| 8,413,244 B1 | 4/2013 | Nachenberg | |
| 8,499,348 B1 | 7/2013 | Rubin | |
| 8,578,493 B1 | 11/2013 | McFadden | |
| 8,682,812 B1 | 3/2014 | Ranjan | |
| 8,762,948 B1 | 6/2014 | Zaitsev | |
| 8,838,951 B1 | 9/2014 | Hicks et al. | |
| 8,839,417 B1 | 9/2014 | Jordan | |
| 8,850,579 B1 | 9/2014 | Kalinichenko | |
| 8,869,268 B1 | 10/2014 | Barger | |
| 2002/0129140 A1 | 9/2002 | Peled et al. | |
| 2003/0097439 A1 | 5/2003 | Strayer et al. | |
| 2005/0018618 A1 | 1/2005 | Mualem et al. | |
| 2006/0026682 A1 | 2/2006 | Zakas | |
| 2006/0212942 A1* | 9/2006 | Barford | H04L 63/1425 726/24 |
| 2007/0067841 A1* | 3/2007 | Yegneswaran | H04L 63/1491 726/23 |
| 2007/0180509 A1 | 8/2007 | Swartz et al. | |
| 2007/0186284 A1 | 8/2007 | McConnell | |
| 2007/0192863 A1 | 8/2007 | Kapoor et al. | |
| 2007/0294768 A1 | 12/2007 | Moskovitch et al. | |
| 2008/0014873 A1 | 1/2008 | Krayer et al. | |
| 2008/0028463 A1 | 1/2008 | Dagon et al. | |
| 2008/0141376 A1 | 6/2008 | Clausen et al. | |
| 2008/0147847 A1 | 6/2008 | Pitkow et al. | |
| 2008/0184371 A1 | 7/2008 | Moskovitch et al. | |
| 2008/0196104 A1 | 8/2008 | Tuvell et al. | |
| 2008/0261192 A1 | 10/2008 | Huang et al. | |
| 2008/0285464 A1 | 11/2008 | Katzir | |
| 2009/0106842 A1 | 4/2009 | Durie | |
| 2009/0150999 A1 | 6/2009 | Dewey et al. | |
| 2009/0158430 A1 | 6/2009 | Borders | |
| 2009/0216760 A1 | 8/2009 | Bennett | |
| 2009/0249484 A1 | 10/2009 | Howard et al. | |
| 2009/0282476 A1 | 11/2009 | Nachenberg et al. | |
| 2010/0037314 A1 | 2/2010 | Perdisci | |
| 2010/0071065 A1 | 3/2010 | Khan et al. | |
| 2010/0100949 A1 | 4/2010 | Sonwane | |
| 2011/0099620 A1 | 4/2011 | Stavrou et al. | |
| 2011/0154497 A1 | 6/2011 | Bailey | |
| 2011/0167494 A1 | 7/2011 | Bowen et al. | |
| 2011/0239299 A1 | 9/2011 | Chen et al. | |
| 2011/0271341 A1 | 11/2011 | Satish et al. | |
| 2011/0302653 A1 | 12/2011 | Frantz et al. | |
| 2011/0320816 A1 | 12/2011 | Yao et al. | |
| 2012/0017281 A1 | 1/2012 | Banerjee | |
| 2012/0167221 A1 | 6/2012 | Kang et al. | |
| 2012/0174225 A1 | 7/2012 | Shyamsunder et al. | |
| 2012/0222117 A1 | 8/2012 | Wong et al. | |
| 2012/0304244 A1 | 11/2012 | Xie et al. | |
| 2012/0311708 A1 | 12/2012 | Agarwal et al. | |
| 2013/0014253 A1 | 1/2013 | Neou | |
| 2013/0097699 A1 | 4/2013 | Balupari et al. | |
| 2013/0133072 A1* | 5/2013 | Kraitsman | H04L 63/1408 726/23 |
| 2013/0333038 A1 | 12/2013 | Chien | |
| 2014/0075557 A1 | 3/2014 | Balabine et al. | |
| 2014/0165207 A1* | 6/2014 | Engel | H04L 63/1425 726/25 |
| 2014/0207917 A1 | 7/2014 | Tock et al. | |
| 2014/0298469 A1 | 10/2014 | Marion et al. | |
| 2015/0135326 A1 | 5/2015 | Bailey, Jr. | |

OTHER PUBLICATIONS

Z. Li et al. "Honeynet-based Botnet Scan Traffic Analysis," Botnet Detection: Countering the Largest Security Threat, 2008, pp. 25-44.*

F. Zhang et al. "Honeypot: a Supplemented Active Defense System for Network Security", Parallel and Distributed Computing, Applications and Technologies, 2003. PDCAT'2003.*

Aho, Alfred V., et al., "Efficient String Matching: An Aid to Bibliographic Search," Communication of the ACM, Jun. 1975, vol. 18, No. 6, pp. 333-340.

Altshuler, Y., et al., "How Many Makes a Crowd? On the Evolution of Learning as a Factor of Community Coverage," LNCS 7227, 2012, pp. 43-52.

Altshuler, Y., et al., "Incremental Learning with Accuracy Prediction of Social and Individual Properties from Mobile-Phone Data," IEEE, 2011, 10 pages.

Altshuler, Y., et al., "Trade-Offs in Social and Behavioral Modeling in Mobile Networks," LNCS 7812, 2013, pp. 412-423.

Argamon, S., et al., "Automatically Profiling the Author of an Anonymous Text," Communication of the ACM, vol. 52, No. 2, Feb. 2009, pp. 119-123.

Argamon, S., et al., "Gender, Genre, and Writing Style in Formal Written Texts," Text & Talk, vol. 23, Issue 3, 2003, 32 pages.

Atkinson, M., et al., "Near Real Time Information Mining in Multilingual News," World Wide Web Conference, Apr. 20-24, 2009, 2 pages.

Bailey, M., et al., "Automated Classification and Analysis of Internet Malware," RAID, 2007, pp. 178-197.

Bayer, U., et al., Scalable, Behavior-Based Malware Clustering, Secure Systems Lab, Technical University, Vienna, 2009, 18 pages.

Bilge, Leyla, et al., "EXPOSURE: Finding Malicious Domains Using Passive DNS Analysis," Feb. 2011, 17 pages.

Cloudshield, Inc., "Lawful Intercept Next-Generation Platform," 2009, 6 pages.

Coffman, T., et al., "Graph-Based Technologies for Intelligence Analysis," CACM, Mar. 2004, 12 pages.

Corney, M., et al. "Gender-Preferential Text Mining of E-mail Discourse," Proceedings of the 18the Annual Computer Security Applications Conference, 2002, 8 pages.

De Vel, O., et al., "Language and Gender Author Cohort Analysis of E-mail for Computer Forensics," Defence Science and Technology Organisation, Australia, 2002, 16 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Dietrich, C.J., et al., "CoCoSpot: Clustering and recognizing botnet command and control channels using traffic analysis," 2012, pp. 475-486.

Eagle, N., et al., "Inferring friendship network structure by using mobile phone data," PNAS, vol. 106, No. 36, 2009, pp. 15274-15278.

(56) References Cited

OTHER PUBLICATIONS

Eslahi, M., "botAnalytics: Improving HTTP-Based Botnet Detection by Using Network Behavior Analysis system," Dissertation, Faculty of Computer Science and Information Technology, University of Malaya, 2010, 124 pages.
Estival, D., et al., "Author Profiling for English Emails," Proceedings of the 10th Conference of the Pacific Association for Computational Linguistics, 2007, pp. 263-272.
Fisk, Mike, et al., "Applying Fast String Matching to Intrusion Detection," Los Alamos National Laboratory and University of California San Diego, Jun. 1975, 22 pages.
FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Goldfarb, Eithan, "Mass Link Analysis: Conceptual Analysis," Jun. 24, 2007, Version 1.1, 21 pages.
Goswami, S., et al., "Stylometric Analysis of Bloggers' Age and Gender," Proceedings of the Third International ICWSM Conference, 2009, pp. 214-217.
Gu, G., et al., "BotMiner: Clustering Analysis of Network Traffic for Protocol- and Structure-Independent Botnet Detection," USENIX Security Symposium, vol. 5, No. 2, XP61009228, 2008, 16 pages.
Gu, G., et al., "BotSniffer: Detecting Botnet Command and Control Channels in Network Traffic," Proceedings of the 15th Annual Network and Distributed System Security Symposium (NDSS'08), San Diego, California, 2008, 18 pages.
Jacob, G., et al., "JACKSTRAWS: Picking Command and Control Connections from Bot Traffic," Proceedings of the 20th Usenix Security Symposium, San Francisco, 2011, 16 pages.
Lakhina, A., et al., "Mining Anomalies Using Traffic Feature Distributions," SIGCOMM, 2005, pp. 217-228.
Livadas, C., et al., "Using Machine Learning Techniques to Identify Botnet Traffic," In 2nd IEEE LCN Workshop on Network Security (WoNS'2006), 2006, pp. 967-974.
Mohrehkesh, S., et al., "Demographic Prediction of Mobile User from Phone Usage," Proceedings Mobile Data Challenge by Nokia Workshop, Newcastle, United Kingdom, 2012, 4 pages.
Navarro, Gonzalo, et al., "Flexible Pattern Matching in Strings: Practical On-Line Search Algorithms for Texts and Biological Sequences," Cambridge University Press, 2002, 166 pages.
Netronome SSL Inspector Solution Overview White Paper, "Examining SSL-encrypted Communications," 2010, 8 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rangel, F., et al., "Overview of the Author Profiling Task at PAN 2013," CLEF 2013 Evaluation Labs, 2013, 13 pages.
Rieck, K., et al., "Botzilla: Detecting the 'Phoning Home' of Malicious Software," Proceedings of the ACM Symposium on Applied Computing (SAC), Sierre, Switzerland, 2010, 7 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, Pontus, et al., "Social network analysis and information fusion for anti-terrorism," CIMI, 2006, 8 pages.
Thonnard, O., et al., "Actionable Knowledge Discovery for Threats Intelligence Support Using a Multi-Dimensional Data Mining Methodolgy," 2008 IEEE International Conference on Data Mining Workshops, 2008, pp. 154-163.
Tongaonkar, Alok S., "Fast Pattern-Matching Techniques for Packet Filtering," Stony Brook University, May 2004, 44 pages.
Verint Systems Inc., "Mass Link Analysis: Solution Description," Dec. 2008, 16 pages.
Wang, H., et al., "NetSpy: Automatic Generation of Spyware Signatures for NIDS," Proceedings of the 22nd Annual Computer Security Applications Conference, Miami Beach, Florida, Dec. 2006, ten pages.
Yu, Fang, et al., "Fast and Memory-Efficient Regular Expression Matching for Deep Packet Inspection," ANCS'06, San Jose, California, Dec. 3-5, 2006, 10 pages.
Yu, Fang, et al., "Gigabit Rate Packet Pattern-Matching Using TCAM," Proceedings of the 12th IEEE International Conference on Network Protocols (ICNP'04), 2004, 10 pages.
European Search Report, dated Mar. 24, 2014, received in connection with corresponding European Application No. 13189920.
European Search Report, dated Jan. 15, 2014, received in connection with corresponding European Application No. 13165912.

\* cited by examiner

SYSTEM AND METHOD FOR MALWARE DETECTION LEARNING

CROSS-REFERENCE TO RELATED APPLICATIONS

This application is a continuation of, and claims the benefit of priority to, U.S. patent application Ser. No. 14/295,758 filed Jun. 4, 2014, the disclosure of which is incorporated herein by reference in its entirety.

FIELD OF THE DISCLOSURE

The present disclosure relates generally to data security, and particularly to methods and systems for detecting malicious software in computer systems.

BACKGROUND OF THE DISCLOSURE

Various types of malicious software, such as viruses, worms and Trojan horses, are used for conducting illegitimate operations in computer systems. Malicious software may be used, for example, for causing damage to data or equipment, or for extracting or modifying data. Some types of malicious software communicate with a remote host, for example for Command and Control (C&C) purposes.

Various techniques for detecting malicious software are known in the art. For example, Rieck et al. describe methods for detecting malicious software at a point when it initiates contact with its maintainer, in "Botzilla: Detecting the 'Phoning Home' of Malicious Software," Proceedings of the ACM Symposium on Applied Computing (SAC), Sierre, Switzerland, Mar. 22-26, 2010, which is incorporated herein by reference.

Jacob et al. describes a system for identifying C&C connections, in "JACKSTRAWS: Picking Command and Control Connections from Bot Traffic," Proceedings of the $20^{th}$ Usenix Security Symposium, San Francisco, Calif., Aug. 8-12, 2011, which is incorporated herein by reference.

Gu et al. describe a method that uses network-based anomaly detection to identify botnet C&C channels in a local area network, in "BotSniffer: Detecting Botnet Command and Control Channels in Network Traffic," Proceedings of the $15^{th}$ Annual Network and Distributed System Security Symposium (NDSS'08), San Diego, Calif., February, 2008, which is incorporated herein by reference.

Gu et al. describe a C&C detection framework that is independent of botnet C&C protocol and structure, in "BotMiner: Clustering Analysis of Network Traffic for Protocol- and Structure-Independent Botnet Detection,"

Proceedings of the $17^{th}$ USENIX Security Symposium, San Jose, Calif., 2008, which is incorporated herein by reference.

Eslahi describes methods for detecting HTTP-based Botnets based on the network behavior analysis, in "botAnalytics: Improving HTTP-Based Botnet Detection by Using Network Behavior Analysis System," Faculty of Computer Science and Information Technology, University of Malaya, 2010, which is incorporated herein by reference.

SUMMARY OF THE DISCLOSURE

An embodiment that is described herein provides a method including monitoring a protected computer network that is to be protected from malicious software, and an infected computer network that is known to be infected with malicious software. First communication transactions that are known to be malicious are extracted from both the protected computer network and the infected computer network. Second communication transactions that are not known to be malicious are extracted only from the protected computer network. One or more malicious communication transactions exchanged with the protected computer network are identified by processing the first and second communication transactions.

In some embodiments, extracting the first communication transactions includes selecting the first communication transactions depending on reputation levels of respective hosts participating in the communication transactions. In an embodiment, extracting the first communication transactions includes including a transaction in the first communication transactions if a host participating in the transaction appears on a blacklist.

In some disclosed embodiments, identifying the malicious communication transactions includes creating, based on the extracted first and second communication transactions, one or more models that distinguish the malicious communication transactions from innocent communication transactions, and detecting the malicious communication transactions using the models. In an example embodiment, identifying the malicious communication transactions includes generating alerts based on the models, receiving an analysis of the alerts from an operator, and detecting the malicious communication transactions based on the analysis of the alerts by the operator.

Identifying the malicious communication transactions may include adapting the models based on the analysis of the alerts by the operator. In a disclosed embodiment, extracting the first communication transactions includes selecting the first communication transactions depending on reputation levels of respective hosts participating in the communication transactions, and the method includes updating at least one of the reputation levels based on the analysis of the alerts by the operator.

The method may include updating selection of the first communication transactions based on the updated reputation levels, and updating identification of the malicious communication transactions by processing the updated first communication transactions. In another embodiment, the method includes extracting from the infected computer network one or more third communication transactions that are not known to be malicious, and identifying the malicious communication transactions includes jointly processing the second and third communication transactions.

There is additionally provided, in accordance with an embodiment that is described herein, a system including a network interface and a processor. The network interface is configured to monitor a protected computer network that is to be protected from malicious software, and an infected computer network that is known to be infected with malicious software. The processor is configured to extract, from both the protected computer network and the infected computer network, first communication transactions that are known to be malicious, to extract, only from the protected computer network, second communication transactions that are not known to be malicious, and to identify one or more malicious communication transactions exchanged with the protected computer network, by processing the first and second communication transactions.

The present disclosure will be more fully understood from the following detailed description of the embodiments thereof, taken together with the drawings in which:

DETAILED DESCRIPTION OF EMBODIMENTS

Overview

Figure 1:
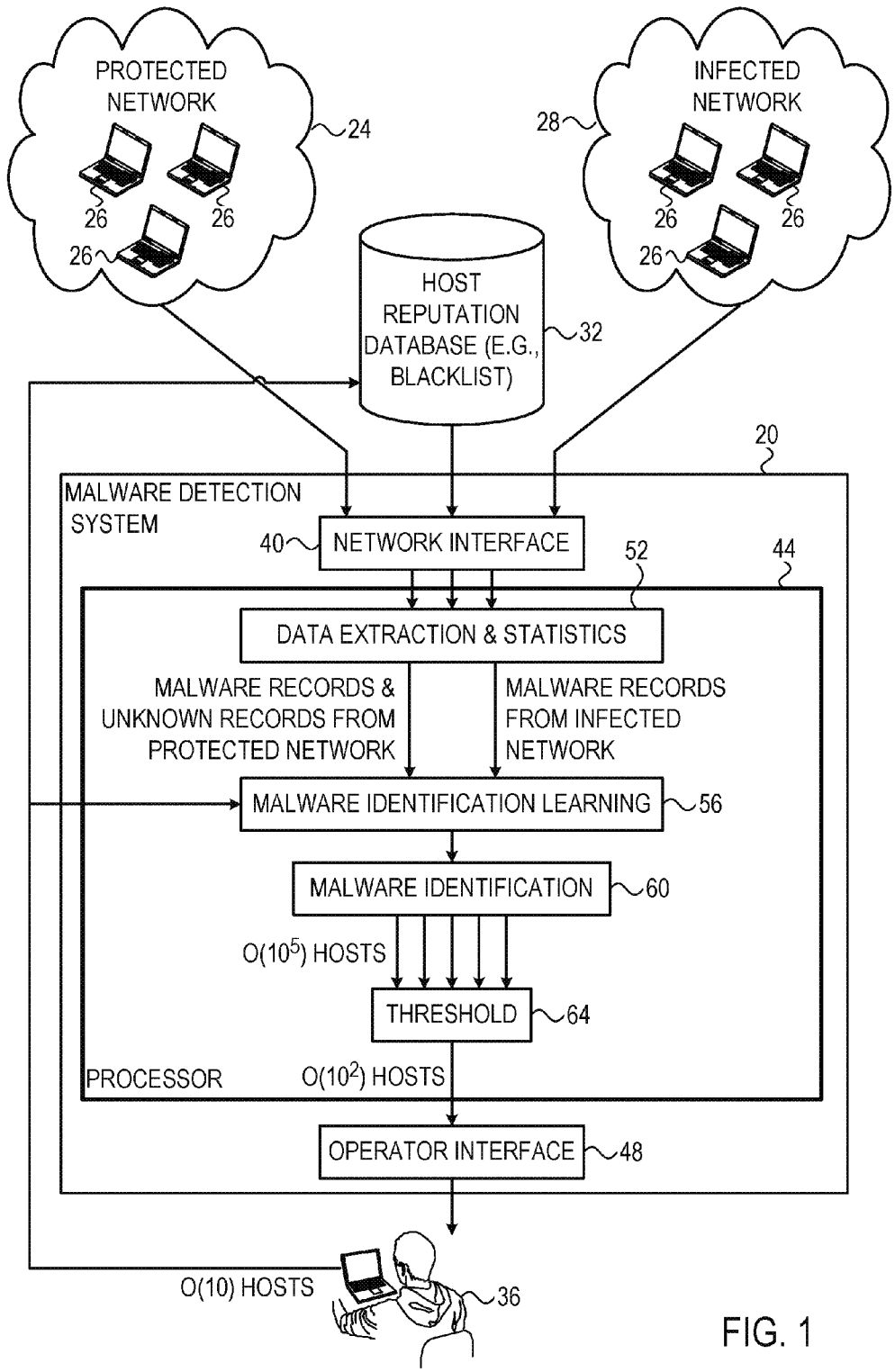
FIG. 1 is a block diagram that schematically illustrates a system for malicious software detection, in accordance with an embodiment that is described herein.

Some types of malicious software ("malware") are controlled by a remote host. Communication between the malware and the host is referred to herein as Command and Control (C&C) communication, and it may involve communication from the host to the malware and/or from the malware to the host. In some cases, communication between the malware and the controlling host may be carried out via one or more intermediary hosts for the purpose of hiding the IP address of the controlling host, and this type of communication is also referred to herein as C&C communication between malware and remote host.

Embodiments that are described herein provide improved malware detection techniques, which detect malware by identifying the C&C communication between the malware and the remote host, and distinguish between communication transactions that carry C&C communication and transactions of innocent traffic.

In the disclosed embodiments, a malware detection system is configured to protect a computer network, referred to as a protected network or a client network.

The system receives from the protected network communication transactions, e.g., HTTP request-response transactions, and attempts to detect transactions relating to malware.

The system typically distinguishes between malware transactions and innocent transactions using malware identification models, which it adapts using machine learning algorithms. In some embodiments, the system trains the machine learning algorithms using external information that points to some transactions as likely to be exchanged with malicious remote hosts. For example, the system may query a reputation database that specifies reputation levels for respective hosts, or a blacklist of hosts known to be malicious.

In practice, however, the number and variety of malicious transactions that can be obtained from the protected network are often extremely limited (often fractions of a percent), too limited for effectively training the machine learning algorithms. Therefore, in some embodiments the system obtains additional malicious transactions from another computer network that is known to be relatively rich in malicious activity. This network is referred to herein as an infected network.

The system is thus able to adapt the malware identification models based on a large number of positive examples— The malicious transactions obtained from both the protected network and the infected network. As a result, the malware identification models are adapted with high speed and accuracy.

Combining malicious transactions from different networks is feasible because, while the features of innocent transactions often differ substantially from one network to another, the features of malicious transactions tend to be similar in different networks.

In some embodiments, malware detection results of the system are fed back and used for updating the host reputation database or blacklist. In an example embodiment, the system generates malware alerts and presents them to an operator. The operator analyzes the alerts and the corresponding transactions, and provides feedback as to the identification quality. This feedback is used both for adapting the models and for updating the reputation database or blacklist. The updated reputation database or blacklist can then be used to detect new types of malware, possibly in a different infected computer in the protected network that communicates with the malicious host. The new malware samples are analyzed, their features extracted, and served to further to enrich the machine learning model.

System Description

FIG. 1 is a block diagram that schematically illustrates a system 20 for malicious software ("malware") detection, in accordance with an embodiment that is described herein. System 20 is used for protecting a computer network 24 (referred to as "protected network" or "client network") from malware such as viruses, worms or Trojan horses.

Protected network 24 may comprise, for example, an internal computer network of an organization that comprises multiple computers 26, such as personal computers, workstations, mobile computing or communication devices or virtual machines. Protected network 24 is typically connected to public such as the Internet (not shown). Computers 26 may communicate with one another over network 24, and/or with servers or other computers in the public network.

In some scenarios, a certain computer 26 in protected network 24 may be infected with malware that carries out various kinds of illegitimate actions, for example stealing data from the infected computer or otherwise from network 24, modify or damage data, or cause damage to the infected computer or other equipment of network 24. In other scenarios, protected network 24 may comprise multiple infected computers, communicating with one "bridgehead" computer in network 24. The "bridgehead" computer in turn communicates with the public network. In these scenarios we typically refer to the "bridgehead" computer as the infected computer whose transactions are to be identified.

Some types of malware are controlled by a remote host, typically external to network 24. Communication between the malware and the remote host may be bidirectional (e.g., command and control between the host and the malware, and extracted data from the malware to the host) or unidirectional (e.g., only from the host to the malware, or only from the malware to the host).

In some embodiments, system 20 identifies malicious software that has infected one or more of computers 26 of network 24, by monitoring communication transactions in or with network 24, e.g., internal communication within network 24 and/or communication between network 24 and the public network. System 20 attempts to identify C&C communication between the malware and its remote host.

In the disclosed embodiments, system 20 also monitors communication transactions in or with an additional network 28, which is referred to as an infected network. Network 28 is known to be relatively rich in malicious activity. Infected network 28 is typically not protected from malware by system 20. Instead, system 20 uses infected network 28 for obtaining positive examples—transactions that are known to be malicious—for the purpose of training the machine learning algorithms that identify the malware in protected network 24. This mechanism is explained in detail below.

The monitoring of networks 24 and 28 is not necessarily performed at the same time. In an example implementation, the infected network is monitored and analyzed first, and the protected network monitored and analyzed later. Additionally or alternatively to obtaining known malicious transactions from infected network 28, positive examples may be obtained from various other suitable sources that are separate from protected network 24.

In some embodiments, system 20 queries a host reputation database 32 as part of the malware identification process. Database 32 publishes reputation levels of respective hosts (e.g., domains or Web servers on the Internet). The reputation of a host is indicative of the trust level of the host or the likelihood that the host is innocent. In one example embodiment, the reputation database comprises a blacklist, i.e., a list of hosts that are likely to be malicious and should not be trusted. In other embodiments, determination of well-known C&C channels may be performed using other methods, such as pattern matching on the content of monitored communications.

In the example embodiment of FIG. 1, system 20 comprises a network interface 40 for communicating with network 24, network 28 and reputation database 32, a processor that carries out the methods described herein, and an operator interface 48 for interacting with an operator 36. Processor 40 comprises various modules—A data extraction and statistics module 52, a malware identification learning module 56 (learning module, for brevity), a malware identification module 60, and a threshold comparison module 64. The roles and functions of these modules will be explained in detail below.

The configurations of system 20 and of processor 44 shown in FIG. 1 are example configurations, which are chosen purely for the sake of conceptual clarity. In alternative embodiments, any other suitable system and/or processor configuration can be used. For example, the functions of processor 44 may be carried out using a different partitioning into modules than the one shown in the figure.

Some elements of system 20 may be implemented in hardware, e.g., in one or more Application-Specific Integrated Circuits (ASICs), Field-Programmable Gate Arrays (FPGAs) or network processors. Additionally or alternatively, some elements of system 20 can be implemented using software, or using a combination of hardware and software elements.

Some of the functions of system 20, such as the functions of processor 44, may be carried out using one or more general-purpose processors (e.g., servers), which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

As noted above, the malware that infects computers is assumed to communicate with a remote host. The communication between the malware and the host is referred to herein as C&C communication. In some embodiments, processor 44 identifies C&C communication transactions that are disguised as an innocent exchange of request-response transactions of a conventional protocol. Further aspects of such malware detection techniques are addressed in Israel Patent Application 219499, filed Apr. 30, 2012, and Israel Patent Application 222648, filed Oct. 23, 2012, which are assigned to the assignee of the present patent application and whose disclosures are incorporated herein by reference.

Malware Detection Using Enriched Malware Records Obtained from Infected Network

Since network 24 is protected from malware, at least to some extent, the number and variety of malware transactions that can be obtained from network 24 are typically small. The limited number and variety of malware transactions may be problematic for adapting the malware identification models of system 20: In a machine learning environment where the number of true positives is very low relative to the true negatives, the quality and speed with which the machine learning algorithms are trained typically depends on the availability of positive examples, i.e., transactions that are known to be malicious.

Thus, in some embodiments system 20 enriches the collection of positive examples by obtaining additional malicious examples from infected network 28. Network 28 may comprise any suitable computer network that is able to provide additional samples of transactions that are known to be malicious. Typically, network 28 is chosen to be a network known to be relatively rich in malicious activity.

Various types of networks can serve as infected network 28, for example honey-pot networks specially designed to attract malware, networks whose malware protection is known to be weak such as Internet Service Provider (ISP) networks, University networks that are often rich in malware, "sandbox" networks, lab networks used for testing known malware, or any other suitable network.

In the present example, network interface 40 receives communication transactions both from protected network 24 and from infected network 28 (as noted above—not necessarily at the same time). Data extraction & statistics module 52 analyzes the transactions so as to extract the following:
  Malware transactions from protected network 24.
  Transactions that are not known to be malware transactions (referred to as unknown transactions for brevity) from protected network 24.
  Malware transactions from infected network 28.

As noted above, in a typical embodiment, unknown transactions are extracted only from protected network 24 and not from infected network 28. Nevertheless, in some embodiments module 52 may extract some unknown transactions from infected network 28 and use them together with the unknown transactions obtained from protected network 24. This sort of solution may typically be chosen if networks 24 and 28 are sufficiently similar (e.g., in terms of the number of hosts, the existence or absence of NAT/proxy, protection mechanisms, and other factors). The number of unknown transactions obtained from infected network 28 is typically smaller than the number of unknown transactions obtained from protected network 24.

Module 52 may use any suitable means for distinguishing between known malware transactions and unknown transactions. In the present example, processor 44 queries reputation database 32 with the host names or addresses of the hosts that participate in the transactions. Depending on the reputation levels specified in database 32, module 52 is able to extract a suitable selection of known malware transactions from networks 24 and 28, and unknown transactions from network 24.

Typically, module 52 extracts certain features from the transactions, whose values help to distinguish malware transactions from innocent transactions. Some possible features relate to the underlying request—response protocol (e.g., HTTP), some features are statistical. Further aspects of such features and their correlation with malware identification are addressed in Israel Patent Applications 219499 and 222648, cited above.

For each transaction (malicious or not, from network 24 or 28), module 52 generates a respective record that is indicative of the extracted feature values. Thus, module 52 generates a volume of malware records (records derived from malware transactions) and unknown records (records derived from transactions that are unknown to be malicious).

The malware records and unknown records are sent from module 52 to learning module 56. Learning module 56 uses the records to adapt one or more malware identification models that are used by processor 44 to identify malware transactions. Since the malware records are enriched with additional malware records from infected network 28, the models can be adapted quickly and accurately.

(Typically although not necessarily, the percentage of malware transactions in the protected network may be very small, e.g., 0.01% of the total transactions. In the infected network, the percentage of malware transactions may be as high as 2%.) In an example scenario, module 52 handles ~1 million sessions in the protected network, of which ~5,000 are malicious, and ~80,000 sessions in the infected network, of which ~3,000 are malicious. The actual transaction rate in this scenario is on the order of 10 transactions per session for normal traffic, and 3-4 transactions per session for malicious traffic. Alternatively, however, any other suitable traffic volumes may be analyzed.

It should be noted that this technique performs well because the features of malicious transactions tend to be similar in different networks. Therefore, it makes sense to combine the malware records from networks 24 and 28 to form a single collection of malware records. The features of innocent transactions, on the other hand, often differ substantially from one network to another (e.g., between networks 24 and 28). For this reason, unknown transactions are obtained only from protected network 24 for which classification is desired.

Malware identification module 60 uses the adapted models to identify malicious transactions in network 24. Typically, the models are defined over the features (e.g., statistical features) extracted by module 52. Examples of such models are given and explained in Israel Patent Applications 219499 and 222648, cited above.

Module 60 typically generates alerts that indicate possible malware detections. Each alert typically comprises an identification of a host participating in the corresponding allegedly-malicious transaction. The alert may also indicate the confidence level of the alert, i.e., the likelihood that the identified transaction in question is indeed malicious.

In an example embodiment, the alerts generated by module 60 indicate an order of 100,000 hosts as possibly malicious. In the present embodiment, threshold comparison module 64 compares the confidence levels of the alerts to some predefined threshold, and retains only the alerts whose confidence level exceeds the thresholds. The other alerts, having lower confidence levels, are discarded. In an embodiment, the alerts at the output of module 64 indicate an order of a hundred hosts as possibly malicious.

In an embodiment, processor 44 sends the alerts generated by module 64 via operator interface 48 for presentation to operator 36 (typically a security analyst). Operator 36 analyzes the alerts, and the corresponding transactions. The operator returns to processor 44, via interface 48, feedback that indicates which of the alerts are correct (i.e., correctly identify malware transactions) and which alerts are false alarms. In an embodiment, the operator feedback narrows down the list of allegedly-malicious hosts to an order of ten.

In some embodiments, processor 44 uses the operator feedback to adapt the malware identification models in module 56, e.g., using any suitable active learning approach known in the art. Additionally or alternatively, processor 44 may use the operator feedback to update one or more of the host reputation values in reputation database 32. For example, if the operator repeatedly identifies a certain host as malicious, processor 44 may reduce the reputation level of that host in database 32. If operator 36 repeatedly identifies a certain host as innocent (i.e., repeatedly marks alerts for this host as false alarms), processor 44 may increase the reputation level of that host in database 32.

The two forms of feedback cause the model adaptation (machine learning) process of system 20 to increase in a performance over time: The operator feedback improves the accuracy of the models applied by module 56. In addition, the operator feedback improves the quality of reputation database 32. Consequently, module 52 classifies subsequent transactions to malicious or unknown with greater accuracy, since the classification is based on the updated reputation levels.

Malware Detection Method Description

Figure 2:
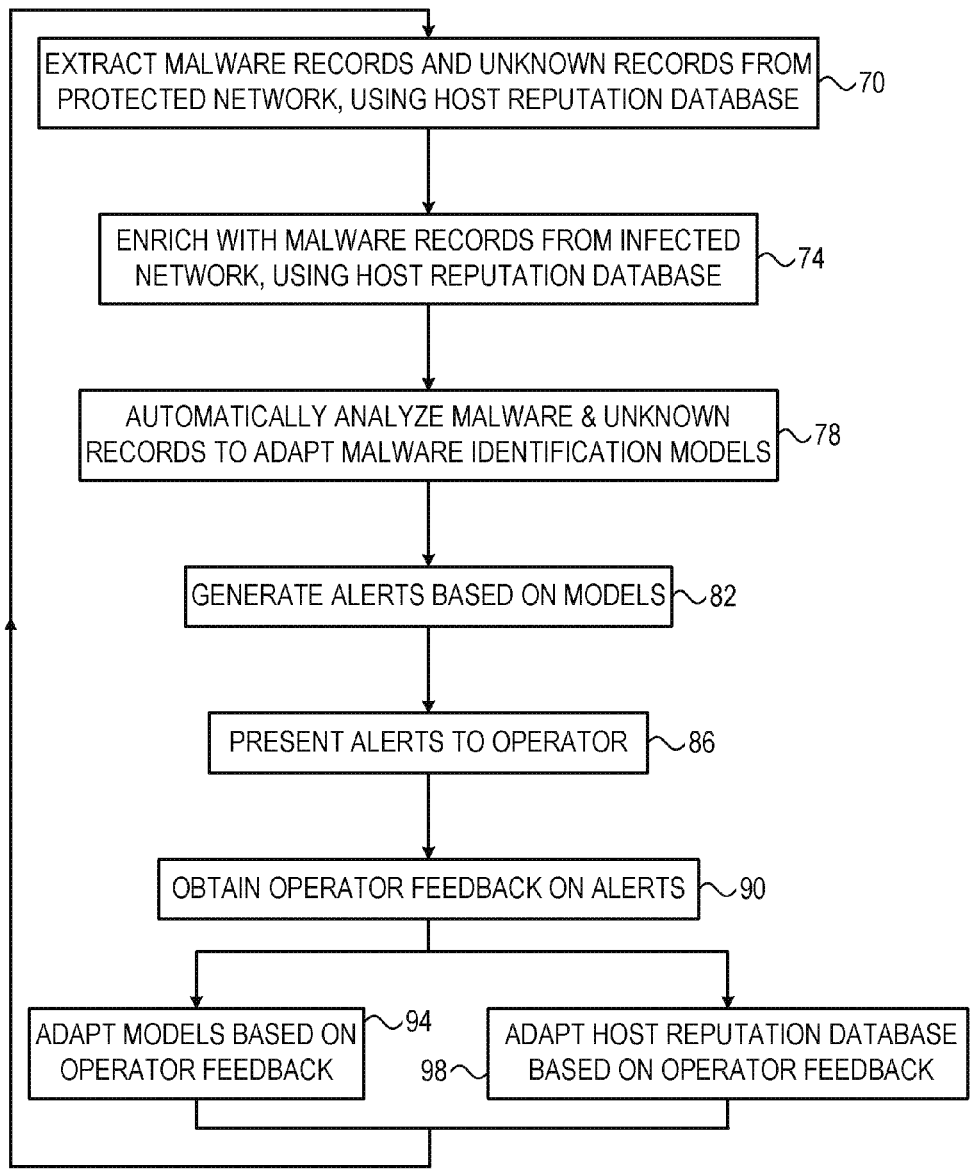
FIG. 2 is a flow chart that schematically illustrates a method for detecting malicious software, in accordance with an embodiment that is described herein.

FIG. 2 is a flow chart that schematically illustrates a method for detecting malicious software, in accordance with an embodiment that is described herein. The method begins with module 52 in processor 44 extracting malware transactions and unknown transactions from protected network 24, and generating respective malware records and unknown records, at a record generation step 70. Typically, module 52 classifies the transactions obtained from network 24 into malicious and unknown by querying reputation database 32.

Module 52 enriches the collection of malware records with records obtained from infected network 28, at a record enrichment step 74. Typically, module 52 identifies malicious transactions in network 28 and generates the respective records. As explained above, module 52 typically identifies the malicious transactions in network 28 by querying reputation database 32.

Learning module 56 adapts the malware identification models based on the malware records (from both networks) and the unknown records (from the protected network), at a learning step 78. Malware identification module 60 generates alerts based on the adapted models, at an alert generation step 82. The alerts undergo initial screening by threshold comparison module 64, based on confidence level.

Processor 44 sends the alerts remaining at the output of module 64 to operator 36, via operator interface 48, at an alert output step 86. Processor 44 receives feedback regarding the alerts from operator 36, at a feedback input step 90. In some embodiments, module 56 uses the operator feedback to adapt one or more of the malware identification models, at a model adaptation step 94. Additionally or alternatively, processor 44 uses the operator feedback to update one or more of the host reputation levels in database 32, at a reputation updating step 98.

The method then loops back to step 70 above, so that processor 44 extracts additional malicious and unknown transactions, possibly substantially different in terms of content, using the reputation levels that were updated at step 98. Subsequent alerts will be generated based on the models that were adapted at step 94. The process typically continues cyclically in this manner, so that the collection of malicious and unknown records grows and the accuracy of the models improves over time. Iterations of the operator-assisted learning scheme of FIG. 2 can be repeated at any desired frequency, e.g., once a day.

Although the embodiments described herein mainly address malware detection, the principles of the present disclosure can also be used for other types of classification of network data, e.g., fraud detection (for example for bank, credit cards or telecom traffic analysis), user profiling, spam detection, and/or operating-system fingerprinting.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
monitoring, by a network interface, a protected computer network that is protected from malicious software by a processor, the protected computer network comprising one or more infected computers, and an infected computer network that is known to be infected with malicious software and is not protected from malicious software by the processor, wherein the protected computer network and the infected computer network are different networks;
extracting, by the processor, from both the protected computer network and the infected computer network, first communication transactions that are known to be malicious;
extracting, by the processor, only from the protected computer network, second communication transactions that are not known to be malicious;
identifying, by the processor, one or more malicious communication transactions exchanged with the protected computer network, by processing the first and second communication transactions;
wherein identifying the malicious communication transactions comprises creating, by the processor, based on the extracted first and second communication transactions, one or more models that distinguish the malicious communication transactions from innocent communication transactions, and detecting the malicious communication transactions using the models.

2. The method according to claim 1, wherein extracting the first communication transactions comprises selecting the first communication transactions depending on reputation levels of respective hosts participating in the communication transactions.

3. The method according to claim 1, wherein extracting the first communication transactions comprises including a transaction in the first communication transactions if a host participating in the transaction appears on a blacklist.

4. The method according to claim 1, wherein identifying the malicious communication transactions comprises generating alerts based on the models, receiving an analysis of the alerts from an operator, and detecting the malicious communication transactions based on the analysis of the alerts by the operator.

5. The method according to claim 4, wherein identifying the malicious communication transactions comprises adapting the models based on the analysis of the alerts by the operator.

6. The method according to claim 5, wherein extracting the first communication transactions comprises selecting the first communication transactions depending on reputation levels of respective hosts participating in the communication transactions, and comprising updating at least one of the reputation levels based on the analysis of the alerts by the operator.

7. The method according to claim 6, and further comprising updating selection of the first communication transactions based on the updated reputation levels, and updating identification of the malicious communication transactions by processing the updated first communication transactions.

8. The method according to claim 1, and further comprising extracting from the infected computer network one or more third communication transactions that are not known to be malicious, wherein identifying the malicious communication transactions comprises jointly processing the second and third communication transactions.

9. A system, comprising:
a network interface, which is configured to monitor a protected computer network that is to be protected from malicious software by a processor, the protected computer network comprising one or more infected computers, and an infected computer network that is known to be infected with malicious software and is not to be protected from malicious software by the processor, wherein the protected computer network and the infected computer network are different networks; and
a hardware computer system comprising the processor, which is configured to extract, from both the protected computer network and the infected computer network, first communication transactions that are known to be malicious, to extract, only from the protected computer network, second communication transactions that are not known to be malicious, and to identify one or more malicious communication transactions exchanged with the protected computer network, by processing the first and second communication transactions;
wherein the processor is configured to create, based on the extracted first and second communication transactions, one or more models that distinguish the malicious communication transactions from innocent communication transactions, and to detect the malicious communication transactions using the models.

10. The system according to claim 9, wherein the processor is configured to select the first communication transactions depending on reputation levels of respective hosts participating in the communication transactions.

11. The system according to claim 9, wherein the processor is configured to include a transaction in the first communication transactions if a host participating in the transaction appears on a blacklist.

12. The system according to claim 9, wherein the processor is configured to generate alerts based on the models, to receive an analysis of the alerts from an operator, and to identify the malicious communication transactions based on the analysis of the alerts by the operator.

13. The system according to claim 12, wherein the processor is configured to adapt the malware detection models based on the analysis of the alerts by the operator.

14. The system according to claim 12, wherein the processor is configured to select the first communication transactions depending on reputation levels of respective hosts participating in the communication transactions, and to update at least one of the reputation levels based on the analysis of the alerts by the operator.

15. The system according to claim 14, wherein the processor is configured to update selection of the first communication transactions based on the updated reputation levels, and to update identification of the malicious communication transactions by processing the updated first communication transactions.

16. The system according to claim 9, wherein the processor is configured to extract from the infected computer network one or more third communication transactions that are not known to be malicious, and to identify the malicious communication transactions by jointly processing the second and third communication transactions.

17. A non-transitory computer-readable medium having stored thereon a sequence of instructions that when executed by a computing system causes, the computing system to perform the steps comprising:
- monitoring a protected computer network that is to be protected from malicious software by the computing system, the protected computer network comprising one or more infected computers, and an infected computer network that is known to be infected with malicious software and is not to be protected from malicious software by the computing system, wherein the protected computer network and the infected computer network are different networks;
- extracting from both the protected computer network and the infected computer network, first communication transactions that are known to be malicious;
- extracting only from the protected computer network, second communication transactions that are not known to be malicious; and
- identifying one or more malicious communication transactions exchanged with the protected computer network, by processing the first and second communication transactions;
- wherein identifying the malicious communication transactions comprises creating, by the processor, based on the extracted first and second communication transactions, one or more models that distinguish the malicious communication transactions from innocent communication transactions, and detecting the malicious communication transactions using the models.

18. The non-transitory computer-readable medium according to claim 17, wherein the step of identifying the malicious communication transactions comprises generating alerts based on the models, receiving an analysis of the alerts from an operator, and detecting the malicious communication transactions based on the analysis of the alerts by the operator.

19. The non-transitory computer-readable medium according to claim 18, wherein the step of extracting the first communication transactions comprises selecting the first communication transactions depending on reputation levels of respective hosts participating in the communication transactions, and comprising updating at least one of the reputation levels based on the analysis of the alerts by the operator.

20. The non-transitory computer-readable medium according to claim 19, having further instructions stored thereon that when executed by the computing system, cause the computing system to perform the additionally steps comprising updating selection of the first communication transactions based on the updated reputation levels, and updating identification of the malicious communication transactions by processing the updated first communication transactions.

* * * * *